United States Patent
Bono et al.

(10) Patent No.: US 10,970,259 B1
(45) Date of Patent: Apr. 6, 2021

(54) SELECTIVE APPLICATION OF BLOCK VIRTUALIZATION STRUCTURES IN A FILE SYSTEM

(71) Applicant: EMC Corporation, Hopkinton, MA (US)

(72) Inventors: Jean-Pierre Bono, Westborough, MA (US); Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1374 days.

(21) Appl. No.: 14/577,387

(22) Filed: Dec. 19, 2014

(51) Int. Cl.
    *G06F 16/30*    (2019.01)
    *G06F 16/188*   (2019.01)
    *G06F 16/11*    (2019.01)

(52) U.S. Cl.
    CPC .......... *G06F 16/188* (2019.01); *G06F 16/122* (2019.01)

(58) Field of Classification Search
    CPC ................................................. G06F 17/30233
    USPC ........................................................ 707/831
    See application file for complete search history.

(56) References Cited

U.S. PATENT DOCUMENTS

| | | | |
|---|---|---|---|
| 7,562,189 B2 | 7/2009 | Hamilton et al. | |
| 7,653,832 B2 | 1/2010 | Faibish et al. | |
| 7,945,726 B2 | 5/2011 | Faibish et al. | |
| 8,407,191 B1* | 3/2013 | Nanda | G06F 16/1748 707/692 |
| 8,442,952 B1* | 5/2013 | Armangau | G06F 16/1752 707/686 |
| 8,578,128 B1* | 11/2013 | Davenport | G06F 16/10 711/202 |
| 9,135,123 B1* | 9/2015 | Armangau | G06F 11/1471 |
| 9,213,601 B2 | 12/2015 | Tuers et al. | |
| 2007/0061540 A1 | 3/2007 | Rafert et al. | |
| 2013/0159359 A1* | 6/2013 | Kumar | G06F 3/0605 707/822 |
| 2013/0238832 A1* | 9/2013 | Dronamraju | G06F 3/0685 711/103 |
| 2014/0143288 A1 | 5/2014 | Grunwald et al. | |

* cited by examiner

*Primary Examiner* — Mahesh H Dwivedi
(74) *Attorney, Agent, or Firm* — BainwoodHuang

(57) ABSTRACT

Improved techniques of managing a data storage system involve selectively inserting block virtualization structures (BVS) in access paths between data blocks of a file system and block pointers pointing to the data blocks. A BVS provides metadata for supporting deduplication of data in that data block. In some arrangements, a file system may support selective insertion of such a BVS between a block pointer and data block according to a specified criterion. For example, such a file system might support insertion of BVS's between block pointers and those data blocks storing cold data for which access latency is not important to overall performance of the data storage system.

15 Claims, 10 Drawing Sheets

US 10,970,259 B1

SELECTIVE APPLICATION OF BLOCK VIRTUALIZATION STRUCTURES IN A FILE SYSTEM

BACKGROUND

Data storage systems are arrangements of hardware and software that include storage processors coupled to arrays of non-volatile storage devices. In typical operation, storage processors service storage requests that arrive from client machines. The storage requests specify files or other data elements to be written, read, created, or deleted, for example. The storage processors run software that manages incoming storage requests and performs various data processing tasks to organize and secure the data stored on the non-volatile storage devices.

Some data storage systems use file systems for organizing data in files. A file system organizes data of a file and provides a map that indicates where particular files' data are stored. The file system stores file data in discrete units called "data blocks" and provides each data block with a physical address in the file system. Each file has an inode that is located in an inode table of the file system and is accessed using the inode. The file system stores the physical addresses of the blocks storing data used by a file in a data structure called an inode and the file's indirect blocks.

The inode of a file has metadata and includes and/or points to block pointers that point to the data blocks where the file data are stored. A block pointer of an inode may either point directly to a data block or indirectly using an indirect block. An indirect block points indirectly to a data block using pointers to other data blocks or to other indirect blocks, which in turn point to data blocks.

Some file systems provide deduplication services to better utilize storage resources on the non-volatile storage devices. For example, a deduplication program may operate in the background to deduplicate data stored in the non-volatile storage devices. Deduplication enables a data storage system to store more data in the same amount of non-volatile storage by freeing duplicate blocks and using pointers to establish block sharing.

File systems that provide deduplication services may support block virtualization structures (BVS's). Block virtualization structures refer to any metadata that decouples a block pointer, direct or indirect, from the block pointed to by the block pointer. Block virtualization can share a block by pointing to another like data structure which points to the data block. From the inode's perspective, the inode is still pointing to the same location before and after deduplication. Some file systems require BVS's to provide deduplication services.

SUMMARY

In a file system that supports block virtualization structures, each block pointer in an inode structure points to a BVS. Users of the client machines may experience slower responses to their storage requests because mapping to data blocks requires accessing and traversing the BVS's in addition to the other metadata structures. However, file systems not including block virtualization structures may contain many redundant blocks, and thus use storage resources less efficiently.

In contrast with the above-described conventional file systems, in which providing BVS's increases latency in responding to storage requests, improved techniques of managing a file system involve selectively inserting BVS's in access paths between data blocks of a file system and block pointers pointing to the data blocks. A BVS for a data block provides metadata for supporting deduplication of data in that data block. In some arrangements, a file system may support selective insertion of such a BVS between a block pointer and data block according to a specified criterion. For example, such a file system supports insertion of BVS's between block pointers and those data blocks storing cold data, i.e., data not recently accessed frequently, for which access latency is not important to overall performance.

Advantageously, users can experience high performance in responding to storage requests directed to data blocks without VBS's while simultaneously enjoying better storage utilization for other data blocks for which VBS's are deployed.

One embodiment is directed to a method of managing a file system in a data storage system. The method includes generating an inode structure describing a file of the file system, the inode structure having block pointers pointing to respective data blocks of the file system storing data of the file. The method further includes, for each of a first set of data blocks of the file system, selectively inserting a BVS between that data block and the block pointer in the inode structure that points to that data block, the BVS providing metadata for supporting deduplication of data of the data block within the file system. The method further includes, for each of a second set of data blocks of the file system, providing access to the block without inserting a BVS that provides metadata for supporting deduplication of data of the data block within the file system.

Additionally, some embodiments are directed to a system constructed and arranged to manage a file system in a data storage system. The system includes memory and controlling circuitry coupled to the memory. The controlling circuitry is constructed and arranged to carry out a method of managing a file system in a data storage system.

Further, some embodiments are directed to a computer program product having a non-transitory, computer-readable storage medium which stores executable code, which when executed by a storage processor of a data storage system, causes the storage processor to perform a method of managing a file system in a data storage system.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques of managing a file system involve selectively inserting BVS's in access paths between data blocks of a file system and block pointers pointing to the data blocks. Advantageously, users can experience higher performance for storage requests directed at certain data blocks while simultaneously making other data blocks available for deduplication within the same file system.

Figure 1:
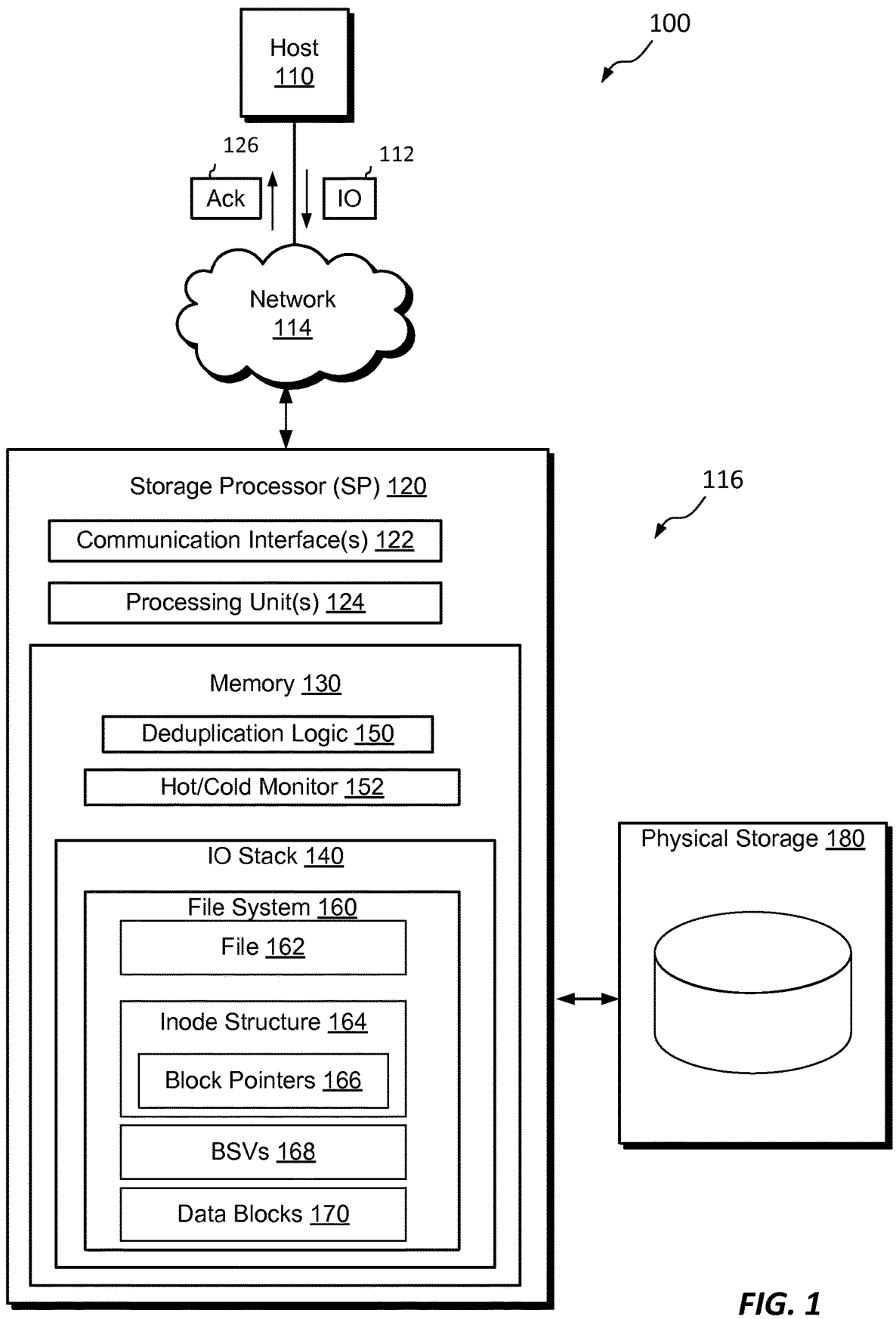
FIG. 1 is a block diagram illustrating an example electronic environment in which the improved technique can be carried out.

FIG. 1 shows an example electronic environment 100 in which embodiments of the improved techniques hereof can be practiced. Here, a host computing device ("host") 110 access a data storage apparatus 116 over a network 114. The data storage apparatus 116 includes a storage processor, or "SP," 120 and non-volatile storage 180. The storage 180 is provided, for example, in the form of hard disk drives and/or electronic flash drives. The data storage apparatus 116 may include multiple SPs like the SP 120. For instance, the data storage system 116 may include a second SP 120a. In an example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs. Additional information about data storage systems in which the improved technique hereof can be practiced is found in U.S. patent application Ser. No. 13/828,322, filed Mar. 14, 2013, the contents and teachings of which are incorporated by reference herein in their entirety.

The network 114 can be any type of network or combination of networks, such as a storage area network (SAN), local area network (LAN), wide area network (WAN), the Internet, and/or some other type of network, for example. In an example, the host 110 can connect to the SP 120 using various technologies, such as Fibre Channel (e.g., through a SAN), iSCSI, NFS, SMB 3.0, and CIFS. Any number of hosts 110 may be provided, using any of the above protocols, some subset thereof, or other protocols besides those shown. The SP 120 is configured to receive IO request 112 and to respond to such IO requests 112 by reading and/or writing the non-volatile storage 180 and sending an acknowledgment 126.

The SP 120 is seen to include one or more communication interfaces 122, a set of processing units 124, and memory 130. The communication interfaces 122 include, for example, SCSI target adapters and network interface adapters, for converting electronic and/or optical signals received from the network 114 to electronic form for use by the SP 120. The set of processing units 124 include one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons, for example.

The memory 130 is seen to include (i.e., realize by operation of programming code) an IO stack 140, deduplication logic 150, and a hot/cold monitor 152. The IO stack 140 provides an execution path for host IOs (e.g., IO request 112). The IO stack 140 includes a file system 160. Underlying data and metadata that support the file system 160 typically reside in the storage 180. The deduplication logic 150 is a software construct configured to cause SP 120 to carry out deduplication operations. The hot/cold monitor 152 is a software construct configured to cause SP 120 to determine whether data blocks of file system 160 are hot (i.e., frequently accessed) or cold (i.e., infrequently accessed).

In some arrangements, the file system 160 is a container file system storing a container file representing a data object, such as a host file system (HFS), a virtual volume (vVol), or a LUN. The SP 120 may host any number of such container file systems. The file system 160 includes an inode structure 164 including an inode and indirect blocks. The inode provides file-specific information about a file 162 in the respective container file system. The inode structure 164 includes location information (i.e., locations of data blocks 170) where data of the file 162 are stored. It should be understood that any container file system might contain multiple files, with each having its own entry in a respective inode table. In some arrangements, each container file system stores not only a file representing a data object, but also snaps of that file and therefore snaps of the data object the file stores.

It should be understood that a container file system may be allocated storage from a storage pool in the form of contiguously allocated storage extents such as "slices." A "slice" is an increment of storage space, such as 256 MB or 1 GB in size, which is derived from the non-volatile storage 180. The pool may allocate slices to a container file system, e.g., to file system 160, for use in storing its files. The pool may also deallocate slices from the container file system if the storage provided by the slices is no longer required. In an example, the storage pool creates slices by accessing RAID groups, dividing the RAID groups into FLUs (Flare LUNS), and further dividing the FLUs into slices. It should be understood that extents do not have to be "slices."

Inode structure 164 has block pointers 166 that point to data blocks 170 directly or indirectly. In some arrangements, block virtualization structures (BVSs) 168 are inserted between data blocks 170 and the block pointers 166 to which they point. BVS's 168 contain information needed when data in a data block 170 has been deduplicated, e.g., pointers to locations in physical storage 180 storing data identical to data in a data block 170. By inserting BVSs in between only some of data blocks 170 and block pointers 166, deduplication of data in data blocks 170 may be supported without significantly impacting overall performance.

Figure 2:
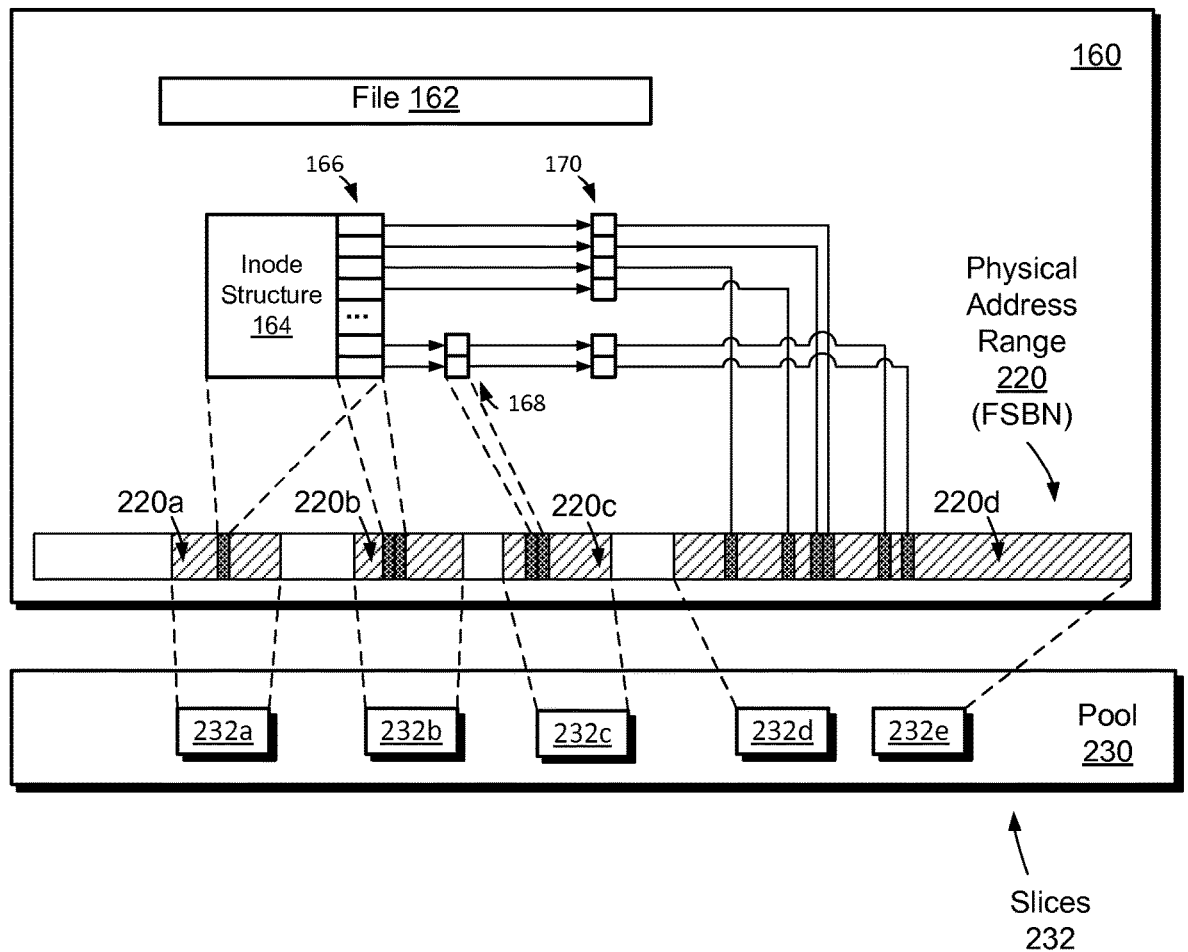
FIG. 2 is a block diagram of an example logical-to-physical mapping of file system elements within the electronic environment shown in FIG. 1.

FIG. 2 shows portions of the file system 160 in additional detail. As shown, the file 162 is a file within file system 160 (i.e., a lower-deck file system). The file 162 has an inode structure 164 that stores information about the file 162. The inode structure 164 includes an inode itself (from an inode table of the file system 160) as well as any indirect blocks 166 needed to address the logical address space of the file 162.

File system 160 is seen to have a physical address range 220, which may be indexed, for example, by FSBN (file system block number), where FSBN ranges from zero to some large number. In the example shown, the physical address range 220 has various subspaces, shown here with references 220a to 220d, which are supported by respective sets of slices 232 served from the storage pool 230. For example, subspace 220a is reserved for inode structures and is backed by slice 232a. Subspace 220b is reserved for indirect blocks and is backed by slice 232b. Subspace 220c is reserved for BVS's and is backed by slice 232c. Subspace 220d is reserved for file data and is backed by slices 232d and 232e, respectively. Although each subspace is seen to be backed by an illustrated number of slices, it is understood that each subspace may be backed by any number of slices. The example shown is merely illustrative.

The inode structure 164 is seen to include block pointers 166 that either point directly or indirectly to data blocks 170 storing data of the file 162 as illustrated in FIG. 2. The data blocks 170 are logical structures and are stored at the physical addresses in the physical address space 220 indicated by the connecting lines.

In some arrangements, BVS's 168 are inserted between some of data blocks 170 and the respective block pointers 166 that point to the data blocks 170. As with data blocks 170, BVS's are logical structures and are stored at the physical addresses in the subspace 220c indicated by the connecting lines.

Figure 3:
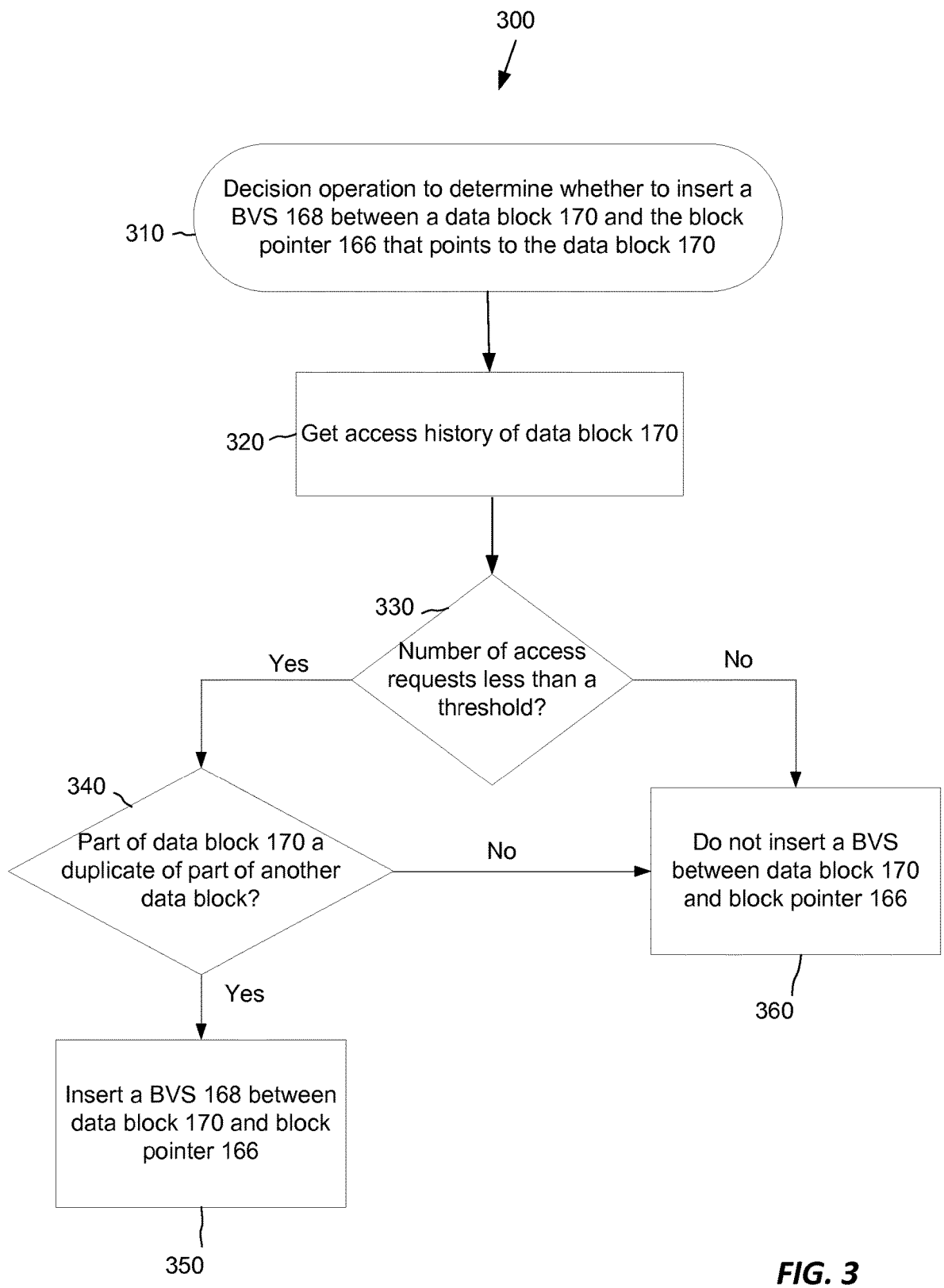
FIG. 3 is a flow chart illustrating an example process of selecting data blocks for deduplication within the electronic environment shown in FIG. 1.

FIG. 3 illustrates an example process 300 by which it is determined whether to insert a BVS 168 between a data block 170 and the block pointer 166 that points to data block 170. Such a process 300 involves invoking a decision operation 310 to determine whether to insert a BVS 168. Decision operation 310 is made based on whether the data block 170 satisfies a specified criterion.

In some arrangements, the decision operation 310 involves determining whether the data block 170 in question contains hot or cold data. It should be understood that, when data is "hot," that data is currently being accessed frequently. In contrast, when data is "cold," that data is currently being accessed infrequently.

As part of decision operation 310 illustrated in FIG. 3 and in an example, the SP 120 gets an access history of the data block 170 at 320. At 330, SP 120 compares a number of access requests over a time period (e.g., minutes, hours, days, etc.) with a threshold number of accesses (e.g., 1, 5, 10, 100, etc.). In this example, the specified criterion is then whether the number of access requests over the time period is less than the threshold. If the specified criterion is satisfied, i.e., the number of access requests over the time period is less than the threshold, then at 340 the SP 120 checks whether at least part of data block 170 is duplicated elsewhere in file system 160. For example, the digest of a part of data block 170 exists in a deduplication database. If this is the case, at 350 the SP 120 inserts a BVS 168 between a data block 170 and the block pointer 166 that points to data block 170. If the specified criterion is not satisfied, i.e., the number of access requests over the time period is greater than or equal to the threshold, or there is no duplicate of a part of data block 170, then at 360 the SP 120 does not insert a BVS 168 between a data block 170 and the block pointer 166 that points to data block 170.

Figure 4:
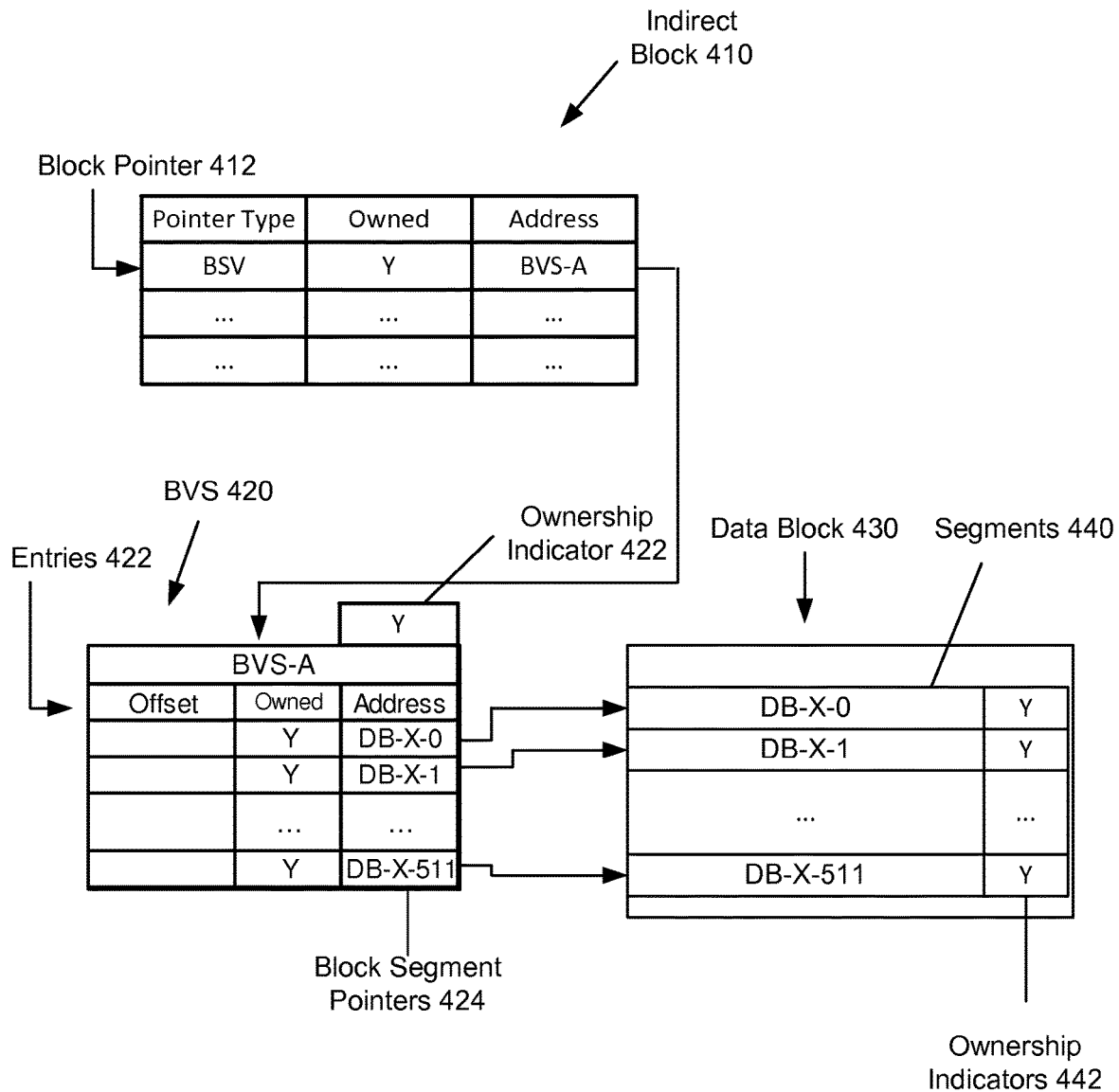
FIG. 4 is a block diagram illustrating an example BVS pointing to block segments within the electronic environment shown in FIG. 1.

FIG. 4 illustrates an example scenario in which a data block 430 has been found to satisfy the criterion described above and illustrates block pointer 412, BVS 420, and data block 430 in further detail. In this case, a BVS 420 has been inserted between data block 430 (lower-right) and block pointer 412 of an indirect block 410.

In an example, data block 430 has an allocation unit (AU) size that is larger than the typical 8 kB AU size found in many file systems. As illustrated in FIG. 4, data block 430 has an AU size of 4 MB, or a factor of 512 times the typical AU size. Other AU sizes may be used. An advantage of such a large AU size is faster access time by the SP 120 because there is less metadata needed for accessing the amount of data contained. However, when deduplication services are desired for better storage utilization, having exclusively large data blocks makes it unlikely that any deduplication might be achieved. Thus, there is a tradeoff between speed, which works better with larger AU blocks, and deduplication efficiency, which works better with smaller AU blocks.

A way to resolve this tradeoff lies in dividing a large AU block into many smaller logical segments 440 of data block 430. In the case illustrated in FIG. 4, there are 512 segments 440 of data block 430. Each segment 440 is capable of storing 8 kB of data and has an address, e.g., DB-X-0, DB-X-1, . . . , DB-X-511, known to BVS 420. The address of a segment 440 need not be known to inode structure 162 (see FIG. 2).

Accordingly, BVS 420 contains entries 422, each entry 422 corresponding to a segment 440 of data block 430. Also, BVS 420 has an ownership indicator 422 that indicates whether data block 430 could be shared by a block in some file. Within each entry 422 there is a block segment pointer 424 that points to a respective segment 440. The relationship between a block segment pointer 424 and the segment 440 to which block segment pointer 424 points is illustrated in FIG. 4 by the arrows between them. Further, each entry 422 also has an offset indicator and an ownership indicator 426.

Indirect block 410 has several block pointers, including block pointer 412 that now points to BVS 420. Block pointer 412 contains information relating to an address of BVS 420 (e.g., BVS-A as illustrated in FIG. 4), ownership information, and the type of block being pointed to (e.g., BVS as illustrated in FIG. 4; other examples include other indirect blocks and data blocks). The pointing relationship between block pointer 412 and BVS 420 is indicated in FIG. 4 by an arrow extended between them.

Figure 5:
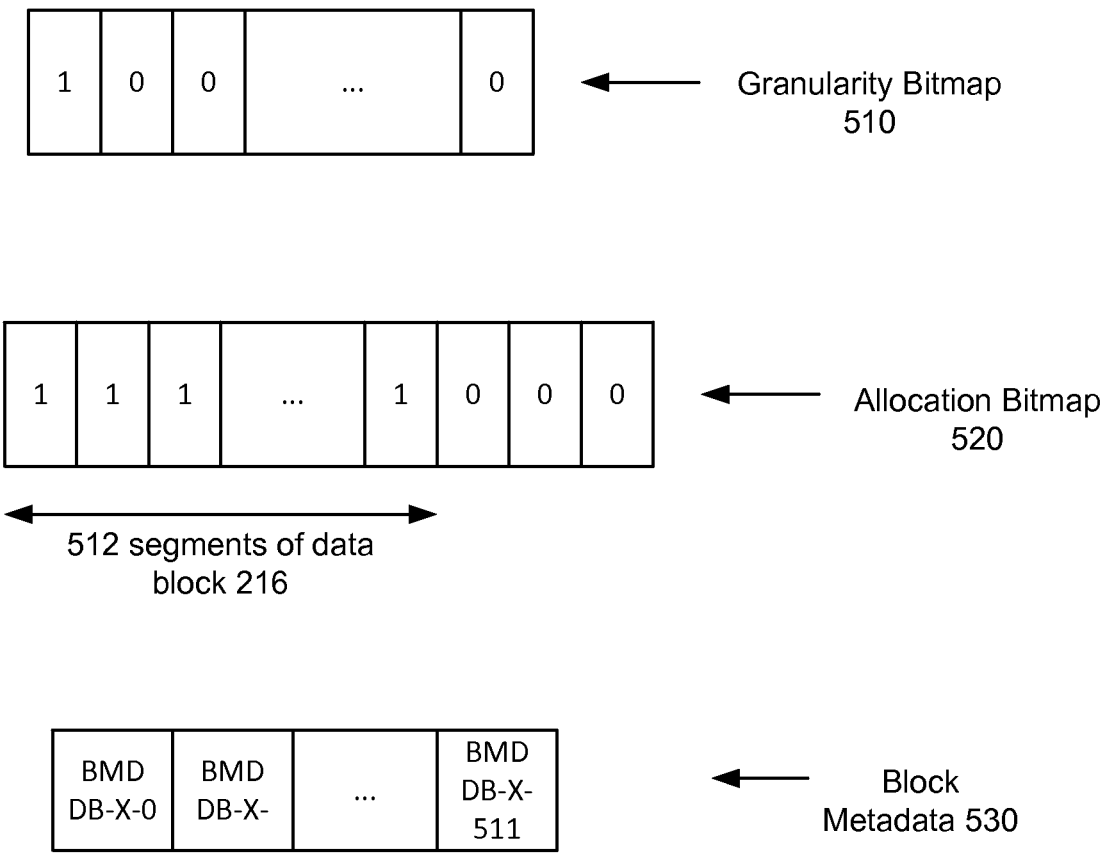
FIG. 5 is a block diagram illustrating an example allocation bitmap and a granularity bitmap in the presence of BVS within the electronic environment shown in FIG. 1.

FIG. 5 illustrates example additional information that may be used by the SP 120 to access segments 440 of data block 430, including a granularity bitmap 510, an allocation bitmap 520, and block metadata 530.

Granularity bitmap 510 includes a set of bits, one bit per data block 170. Each bit takes a value of one when there is a BVS inserted between a corresponding data block 430 and the block pointer 412 that points to data block 430. Each bit takes the value zero when there is no BVS inserted between a corresponding data block 430 and the block pointer 412 that points to data block 430. In an example, SP 120 references granularity bitmap 510 in order to locate blocks that are eligible for deduplication.

Allocation bitmap 520 includes a set of bits, one bit per segment and may apply to multiple data blocks 430. Each bit of the allocation bitmap 520 takes a value of one when a corresponding segment 440 is allocated. Each bit takes the value zero when the corresponding segment 440 is free. A contiguous set of bits in allocation bitmap 520 are provided for the segments of a data block 430. SP 120 references allocation bitmap 520 during a deduplication operation.

In an example, block metadata (BMD) 530 is formatted for each segment 440 of a data block 430. Thus, each segment 440 has its own BMD 530. Each BMD 530 of a segment 440 contains a pointer to the BVS entry 422 containing a block segment pointer 424 that points to that segment 440.

Figure 6:
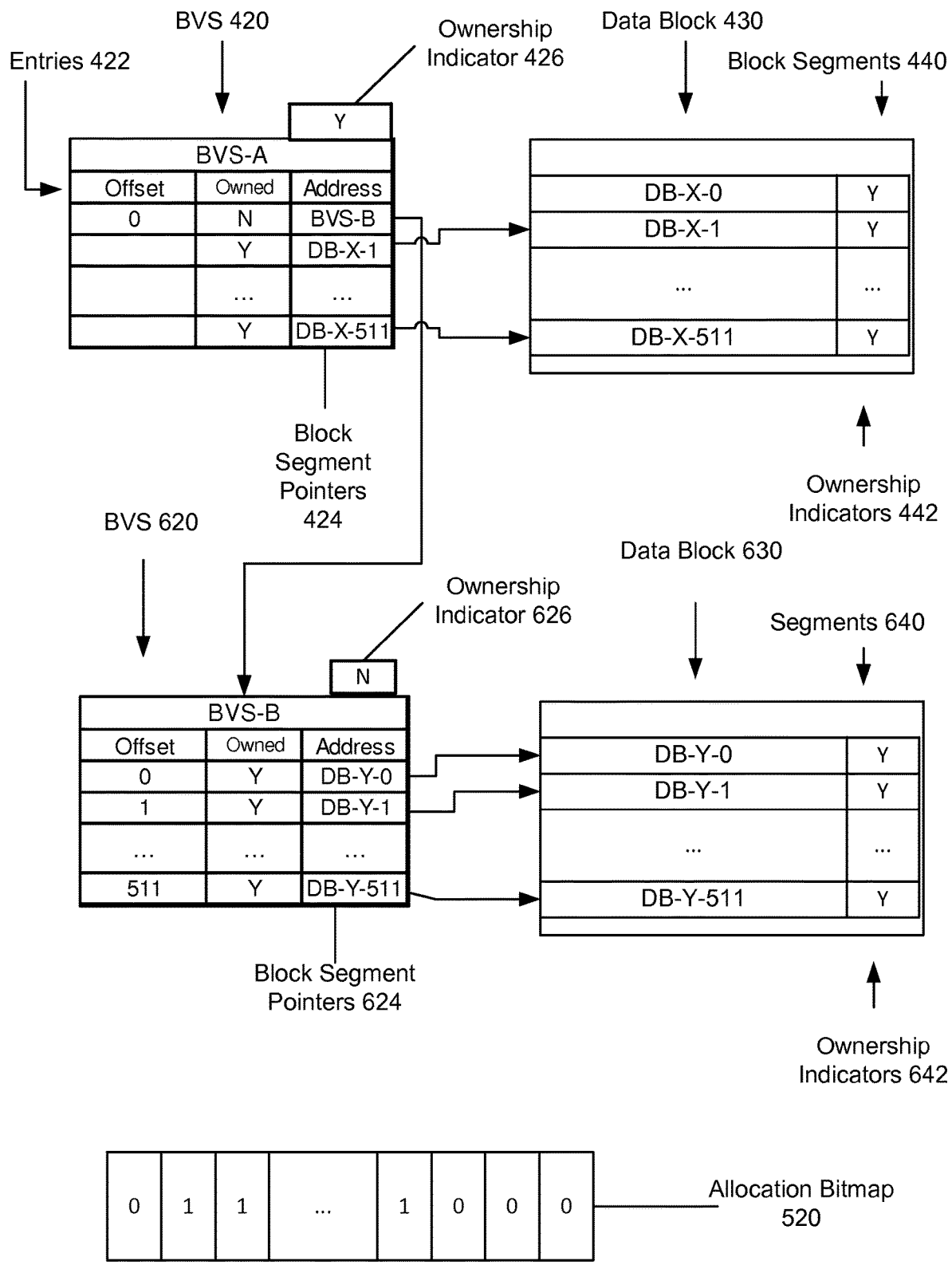
FIG. 6 is a block diagram illustrating an example deduplication operation on a block segment in the presence of BVS within the electronic environment shown in FIG. 1.

FIG. 6 illustrates an example scenario in which deduplication is applied to data in data block 430. Beside BVS 420 and data block 430 as illustrated in FIG. 4, FIG. 6 shows another BVS 620 and corresponding data block 630. It should be understood that BVS 620 is inserted between data block 630 and a block pointer that points to data block 630.

In this example scenario, SP 120 has determined that the data stored in segment DB-X-0 of data block 430 is identical to the data stored in segment DB-Y-0 of data block 630. For example, SP 120 may store in a database digests of each segment of each data block in file system 160. In a deduplication operation on data in data block 430, SP 120 compares the digest of each segment 440 to each of the digests stored in the database. In this case, SP 120 has found a match between the digest of segment DB-X-0 and the digest of DB-Y-0.

Upon finding that the data in segment DB-X-0 is identical to the data in DB-Y-0, SP 120 frees segment DB-X-0. In freeing this duplicate segment, SP 120 updates the BVS entry 422. First, SP 120 updates the block segment pointer 424 to point to BVS 620 instead of DB-X-0. Second, SP 120 updates the offset value of entry 422 to reflect that block segment pointer 424 now points to DB-Y-0, i.e., the zeroth offset into BVS 620. Third, SP 120 updates the ownership indicator of entry 422 from 'Y' to 'N' to reflect that the entry 422 now points to a shared block, i.e., BVS-B. SP 120 also updates the ownership indicator of BVS 620 from 'Y' to 'N' to reflect that data block 630 is shared. SP 120 then updates the bit of allocation bitmap 520 corresponding to segment DB-X-0 from '1' to '0' to reflect that the segment is now free.

It should be understood that the deduplication operation illustrated in FIG. 6 is but one scenario in which deduplication may be carried out on data stored in a segment of a data block. There are other scenarios, for example, in which data stored in a segment of a particular data block is found to be identical to data stored in a another block having a smaller AU size that that used for the particular data block.

Figure 7:
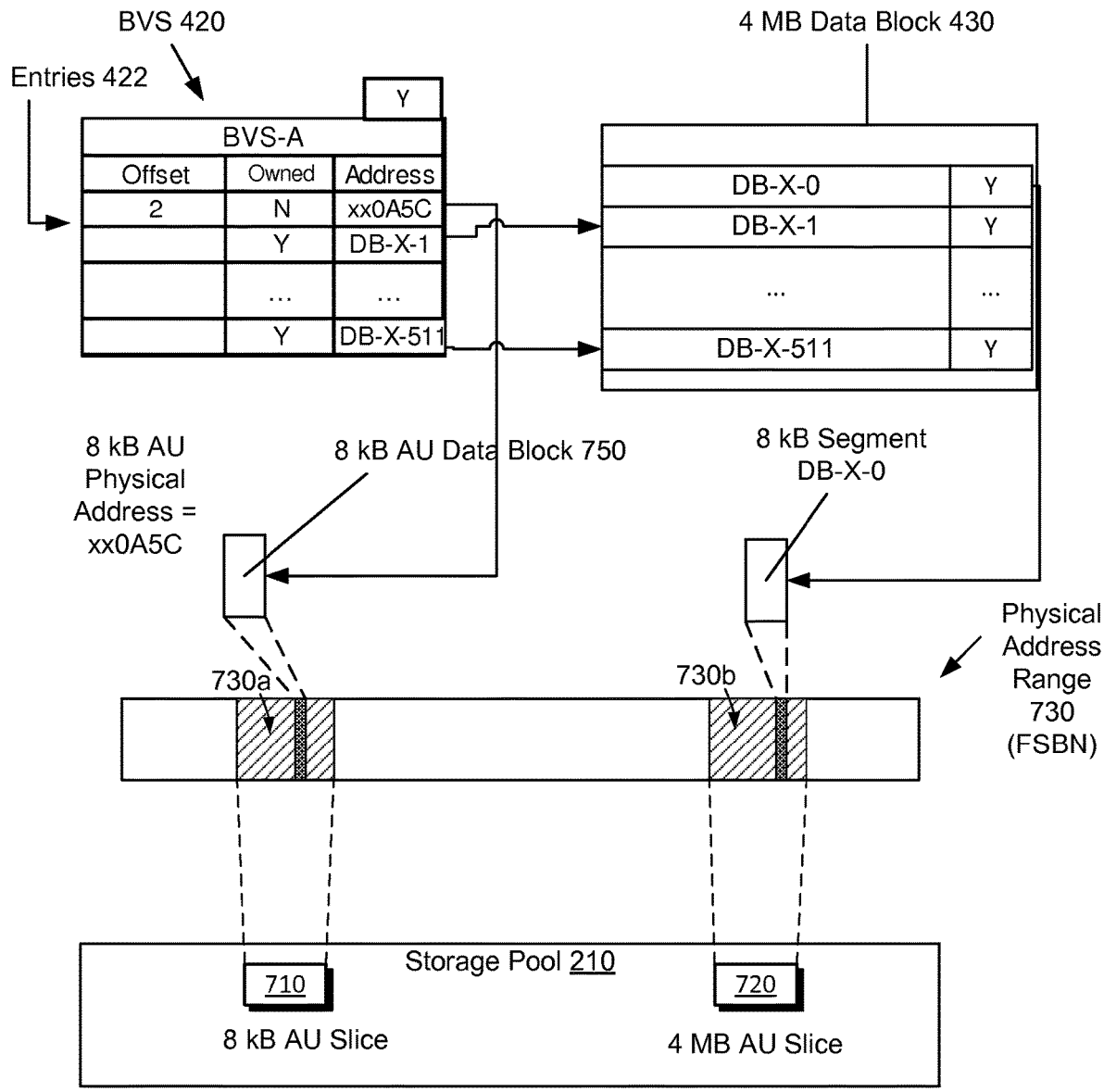
FIG. 7 is a block diagram illustrating an example pointer of the BVS pointing to a data block of a small allocation unit (AU) size in a separate slice within the electronic environment shown in FIG. 1.

FIG. 7 illustrates an example scenario of deduplication in the presence of data blocks of file system 160 having two AU sizes. In this case, file system 160 supports blocks each having one of two AU sizes: 8 kB or 4 MB. The physical address range 730 has various ranges, shown here with references 730a and 730b, which are supported by an 8 kBs AU slice 710 and a 4 MB AU slice 720 served from the storage pool 230.

In this example scenario, SP 120 found that the data stored in entry DB-X-0 of data block 430 is identical to data stored in a block 750. In that case, SP 120 performs a deduplication operation on the data stored in entry DB-X-0. As a result, SP 120 updates the address field of BVS entry 422 to the address of slice 710, i.e., "xx0A5C". As illustrated in FIG. 7, the 8 kB AU block 750 storing the identical data is at the second offset from the beginning of slice 710, so the offset field of BVS entry 422 is changed to "2". SP 120 also updates the ownership indicator of entry 422 from 'Y' to 'N' to reflect that the entry 422 now points to a shared block, i.e., block 750. As before, the bit of allocation bitmap 520 corresponding to segment DB-X-0 is changed from "1" to "0" to reflect the freeing of that segment.

Figure 8:
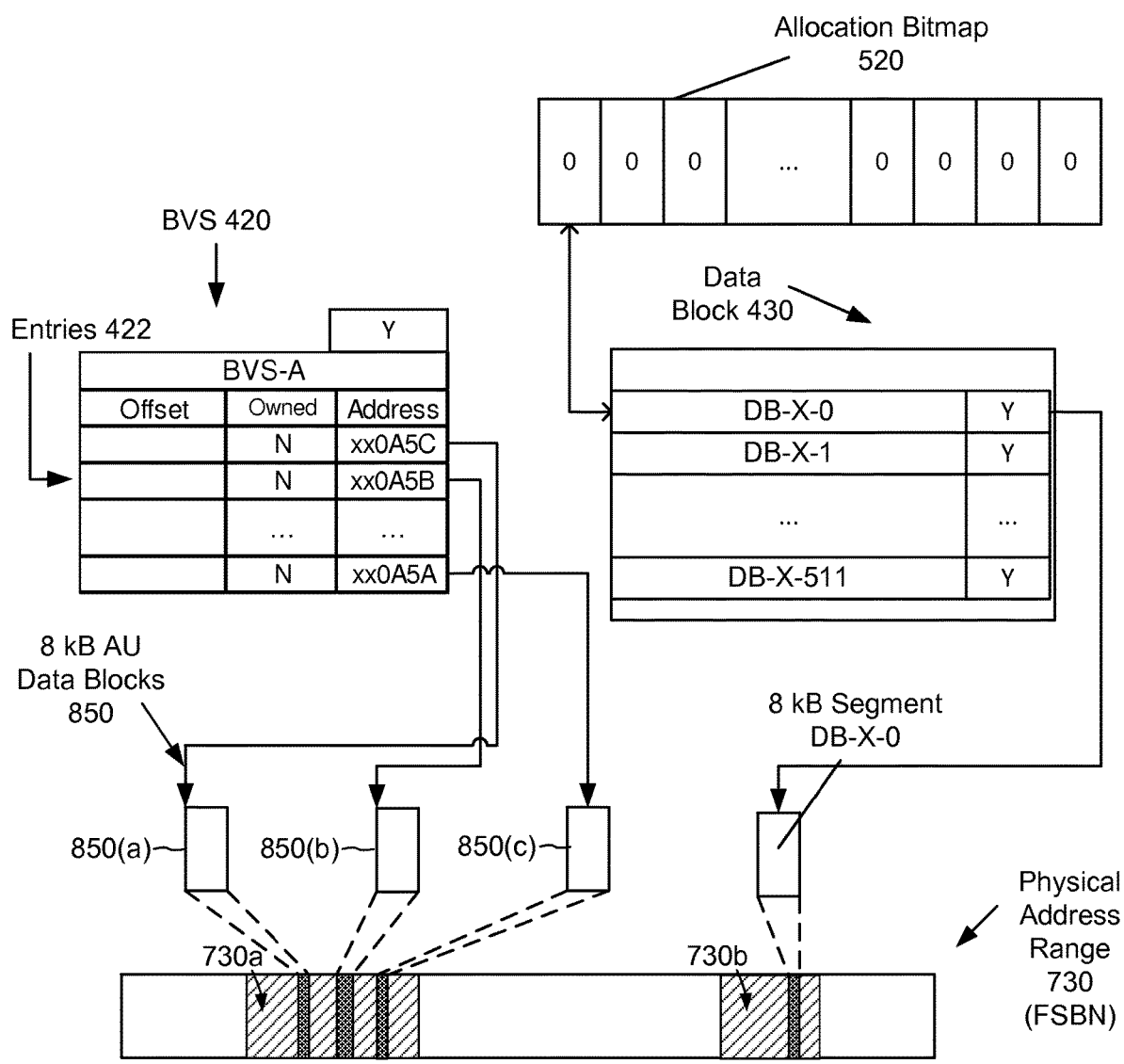
FIG. 8 is a block diagram illustrating an example process of freeing a data block within the electronic environment shown in FIG. 1.

FIG. 8 illustrates an example scenario of freeing data block 430 after deduplication of one of its segments. In this scenario, segment DB-X-0 of data block 430 has been deduplicated to an 8 kB AU block 850(a).

In this case, SP 120 reads allocation bitmap 520 to locate all of the bits of allocation bitmap 520 corresponding to the segments of data block 430. Each of those bits that still has a value of "1" is currently allocated. Data block 430 is not free because there are segments, e.g., DB-X-1, DB-X-511, still allocated. Freeing data block 430 has the benefit of providing available, contiguous space to file system 160.

To free data block 430 in its entirety, SP 120 first locates free 8 kB AU data blocks 850(b) and 850(c), corresponding, respectively, to segments DB-X-1 and DB-X-511. Alternatively, SP 120 may locate free block segments of other data blocks in file system 160 or, in the case of a duplicate segment, may point to another BVS. In any case, SP 120 updates the block segment pointers 424 of BVS 420 to point to these new blocks. In FIG. 8, the new free blocks are located in physical address range 730(a) having the respective addresses 'xx0A5B' and 'xx0A5A'.

As illustrated in FIG. 8, the free blocks to which the block segment pointers pointing to DB-X-1 and DB-X-511 will point are located at respective blocks 850(b) and 850(c). Thus, to free data block 430, SP 120 updates BVS entries 422 to reflect the change of addresses to 'xx0A5B' and 'xx0A5A'. Once SP 120 has completed these updates to BVS entries 422, then SP 120 changes the respective bit values of allocation bitmap 520 to '0'. In this way, data block 430 has been freed.

Figure 9:
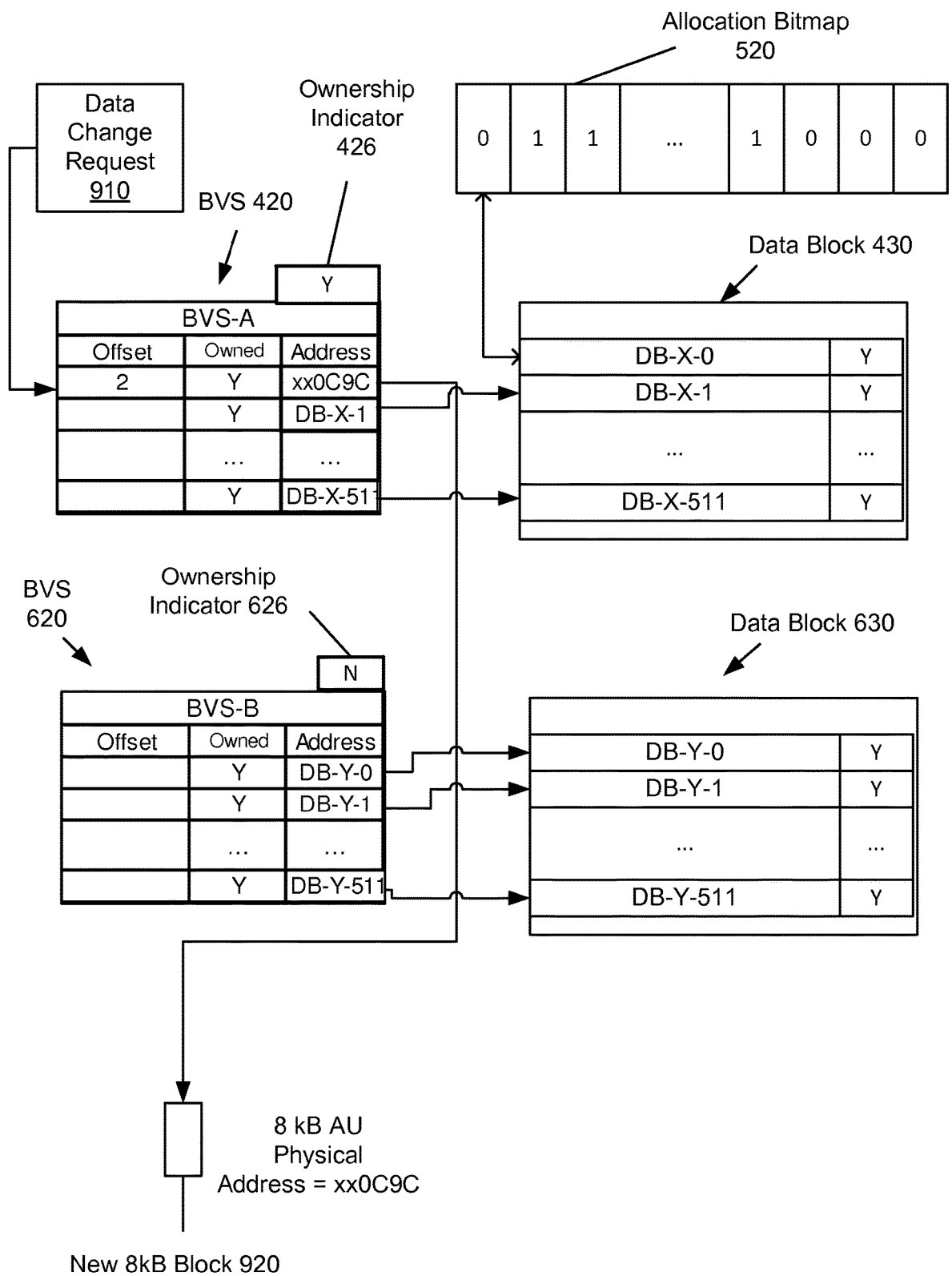
FIG. 9 is a block diagram illustrating an example write split process within the electronic environment shown in FIG. 1.

FIG. 9 illustrates an example scenario in which a write split might occur. In this example scenario, SP 120 receives a data change request 910 from host 110. Data change request 910 is a request to write data to data block 430, specifically at segment DB-X-0. However, the data stored in segment DB-X-0 has been deduplicated in the manner described in FIG. 6, i.e., the block segment pointer 424 points to offset 0 in BVS-B, i.e., block segment DB-Y-0 of data block 630.

It should be understood that SP 120 may not simply perform the data change specified in request 910 on segment DB-Y-0 because the data in that segment is shared with another file. SP 120 may see that this is the case from the "N" value in the ownership indicator of BVS 620, as well as the "N" value of the Owned field in BVS entry 422 corresponding to segment DB-X-0.

One way for SP 120 to proceed is to reset the pointer in BVS entry 422 to "DB-X-0" and perform the updates in that segment. However, it may be the case that there is a need to free data block 430 for other reasons. In that case, simply resetting that pointer back to its original value is not an option.

However, as illustrated in FIG. 9, SP 120 must find a new block or block segment in which to copy the data in block segment DB-Y-0. In this case, SP 120 has located a free 8 kB AU block 920 of slice 940. SP 120 then copies the data to block 920, updates the BVS entry 422 as described previously, and performs the requested data change in block 920.

It should be understood that block 920 is now owned because no other file is pointing to it.

Figure 10:
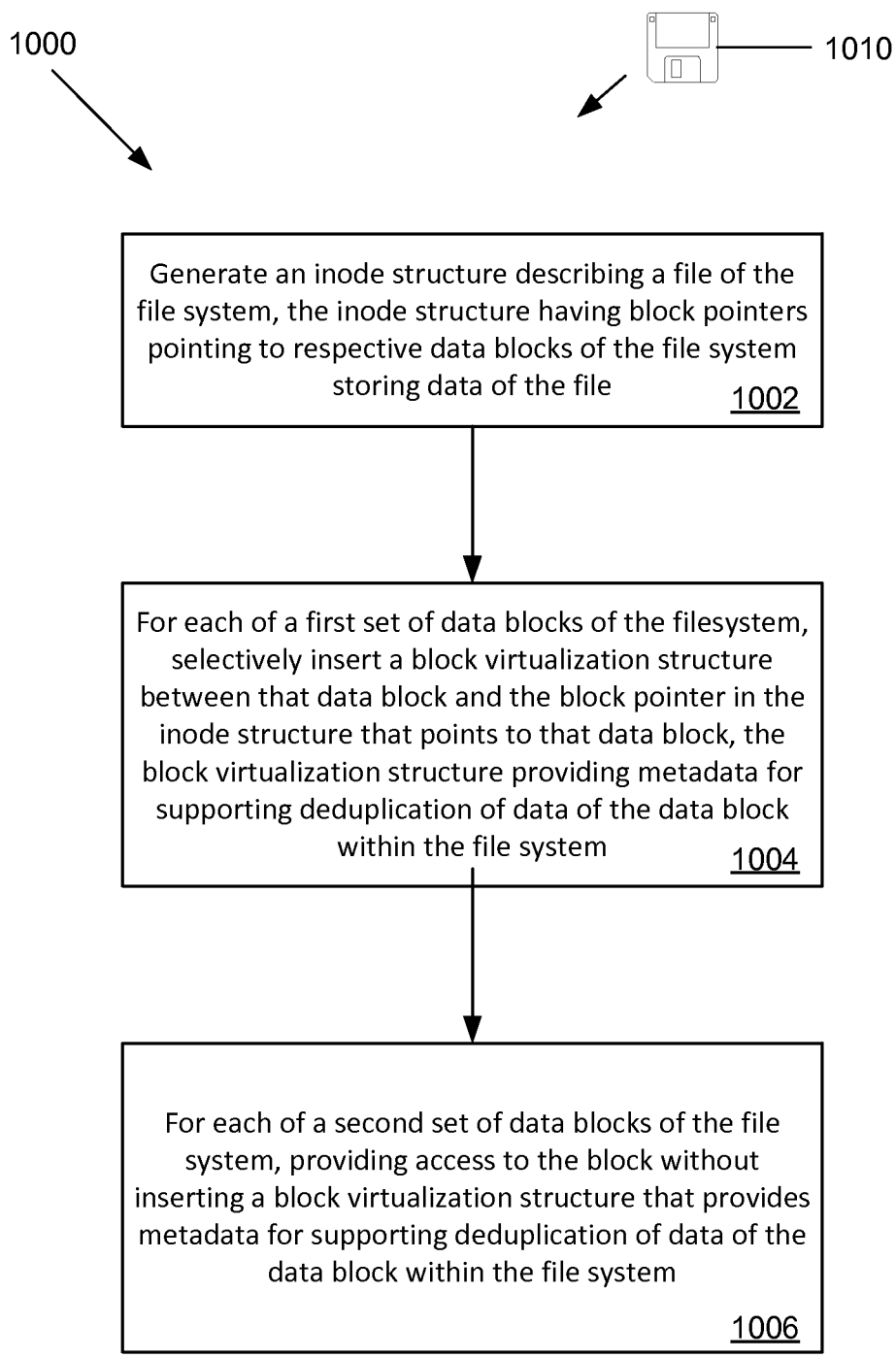
FIG. 10 is a flow chart illustrating an example method of managing a data storage system within the electronic environment shown in FIG. 1.

FIG. 10 illustrates an example process 1000 for managing a file system in a data storage system and provides a summary of some of the material presented above. The process 1000 may be performed by the software constructs described in connection with FIGS. 1-9, which reside in the memory 130 of the SP 120 and are run by the set of processing units 124. The various acts of the process 1000 may be ordered in any suitable way. Accordingly, embodiments may be constructed in which acts are performed in orders different from those illustrated, which may include performing some acts simultaneously, even though the acts are shown as sequential in the illustrated embodiments.

At 1002, an inode structure describing a file of the file system is generated, the inode structure having block pointers pointing to respective data blocks of the file system storing data of the file. The file has a logical address space. The file system maps the logical address space to multiple physical addresses supplied by slices of physical storage served by a storage pool. For example, such physical storage may be and backed by a set of RAID groups (Redundant Array of Independent Disks) providing storage for the file system in a set of RAID-protected stripes. As shown in FIG. 2, inode structure 164 has block pointers 166 to data blocks 170. The file system 160 assigns physical addresses to each of these file elements and then maps the physical address space to separate subspaces of the FSBN. In this way, the inode structure 164 is generated.

At 1004, for each of a first set of data blocks of the file system, a block virtualization structure (BVS) is inserted between that data block and the block pointer in the inode structure that points to that data block, the BVS providing metadata for supporting deduplication of data of the data block within the file system. For example, a BVS is supported within the file system 160 in a similar fashion as the inode structure 164, block pointers 166, and data blocks 170. (See FIG. 2.) FIG. 3 shows one way the first set of data blocks might be generated: by comparing access requests for a data block. Data blocks having a small number of access requests, i.e., "cold" data, may have a BVS and be broken down into segments.

At 1006, for each of a second set of data blocks of the file system, access to the block is provided without inserting a BVS that provides metadata for supporting deduplication of data of the data block within the file system. For example, a user requires the best possible performance in the case of "hot" data. Therefore, it is prudent to not insert a BVS in this case.

Improved techniques of managing a data storage system have been described that involve selectively inserting BVSs in access paths between data blocks of a file system and block pointers pointing to the data blocks. Advantageously, users can experience high performance in responding to storage requests directed to data blocks without VBS's while simultaneously enjoying better storage utilization for other data blocks for which VBS's are deployed. One benefit of such a hybrid file system is in the preservation of snaps. Currently, changing from a high latency deduplication environment to a high performance standalone environment involves migrating blocks from a deduplication container file system to a standalone container file system. Unfortunately, in the current state of technology, such a migration involves the loss of snaps. Using the improved techniques, one may switch blocks between a high-utilization mode and a high-performance mode without the loss of any snaps because there is no migration involved.

Having described certain embodiments, numerous alternate embodiments or variations can be made. For example, while it was described to perform write splits in blocks having a small AU size, this is by no means a requirement. It should be understood that SP such a write split may be performed in a free block segment of another data block.

Further, it was described to insert a BVS in between a data block and the block pointer pointing to the data block when a hot data block became cold. It should be understood that the reverse process may be carried out when a cold data block becomes hot. In that case, SP 120 may collect deduplicated segments of a data block and place them in a contiguous physical address space to form a data block of a large AU size. Such a data block would have no BVS and would experience higher performance.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 1010 in FIG. 10). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of managing a file system in a data storage system, the method comprising:

generating, by a processor of the data storage system, an node structure describing a file of the file system, the node structure having block pointers pointing to respective data blocks of the file system storing data of the file;

for each of a first set of data blocks of the file system, configuring deduplication for the respective data block by selectively inserting, in response to an access frequency to the data block being below a threshold, a block virtualization structure (BVS) between that data block and the block pointer in the node structure that points to that data block, the BVS providing deduplication metadata of the data block within the file system; and for each of a second set of data blocks of the file system, disabling deduplication of the respective data block by providing, in response to the access frequency to the data block exceeding the threshold, access to the block without inserting a BVS that provides metadata for supporting deduplication of data of the data block within the file system, wherein the method further comprises, prior to the act of inserting, performing a decision operation to determine whether to insert a BVS between a data block and a block pointer that points to the data block based on a specified criterion, data blocks of the first set of data blocks satisfying the specified criterion, data blocks of the second set of data blocks not satisfying the specified criterion, wherein the specified criterion is satisfied when an access frequency of a data block is less than the threshold, and wherein performing the decision operation includes comparing the access frequency of the data block to the threshold, wherein each data block has a size; and wherein, for each of the first set of data blocks, inserting the BVS between the data block and the block pointer includes providing multiple BVS entries, each BVS entry having a block segment pointer that points to a respective segment of the data block, each segment having a size that is a fraction of the size of the data block, wherein generating the inode structure includes allocating a bit in a granularity bitmap, the granularity bitmap having bits corresponding to respective data blocks of the file system, each bit of the granularity bitmap indicating whether a BVS has been inserted between the data block to which the bit corresponds and the block pointer pointing to that data block; and wherein, for each of the first set of data blocks, inserting the BVS between the data block and the block pointer includes updating the bit of the granularity bitmap corresponding to the data block to indicate that a BVS has been inserted between the data block and the block pointer.

2. A method as in claim 1, wherein a first BVS entry of the BVS has a first block segment pointer that points to a first segment of the data block; and wherein the method further comprises performing a deduplication operation on data contained in the first segment, the deduplication operation including updating the first block segment pointer to point to a location in the file system at which data that is identical to data stored in the first segment is stored.

3. A method as in claim 2, wherein the location in the file system at which the data that is identical to the data stored in the first segment is stored is at a second segment of a second data block; and wherein updating the first block segment pointer to point to the location in the file system includes redirecting the first block segment pointer to point to an entry of a second BVS containing a second block segment pointer that points to the second segment.

4. A method as in claim 2, wherein providing the multiple BVS entries includes providing an allocation bitmap, the allocation bitmap having bits corresponding to respective segments of the data block, each bit of the allocation bitmap indicating whether a respective segment is allocated or free; and wherein performing the deduplication operation on the data contained in the first segment includes updating the bit of the allocation bitmap corresponding to the first segment to indicate that the first segment is free.

5. A method as in claim 4, wherein the method further comprises, after performing the deduplication operation:
identifying, from the allocation bitmap, segments of the data block that are allocated;
writing data contained in the identified segments to other locations in the file system; and
after writing the data, freeing the data block.

6. A method as in claim 5, wherein the file system has a first extent of data blocks and a second extent of data blocks allocated to it, the first extent containing data blocks having a first allocation unit (AU) size, the second extent containing data blocks having a second AU size;
wherein the data block is contained in the first extent of the file system; and
wherein writing the data contained in the identified segments to the other locations in the file system includes, for each identified segment, copying the data contained in that identified segment to a data block contained in the second extent.

7. A method as in claim 4, further comprising, after performing the deduplication operation on the data contained in the first segment:
receiving a request to make changes to the data contained in the first segment;
verifying, from the allocation bitmap, that the first segment is not in use;
locating, from the first block segment pointer, a segment of another data block to which the first block segment pointer points;
copying the data contained in the segment of the other data block to a new location in the file system;
applying the changes to the data copied to the new location; and
updating the first block segment pointer to point to the new location in the file system.

8. A method as in claim 1, wherein the method further comprises:
verifying, from the granularity bitmap, that a BVS has been inserted between the data block and the block pointer;
locating block segment pointers contained in the BVS entries that point to other BVS entries;
redirecting those block segment pointers of the entries of the BVS that point to the other BVS entries to point to segments of the data block.

9. A method as in claim 1, wherein providing the multiple BVS entries includes allocating block metadata for each respective segment of the data block, the block metadata allocated for the segment of the block data containing a pointer to the BVS entry having the block segment pointer that points to the segment of the data block.

10. A method as in claim 1 wherein, when inserting the BVS between the data block and the block pointer, the multiple BVS entries are provided together in the BVS.

11. A method as in claim 1, further comprising performing a deduplication operation using the BVS inserted between the data block and the block pointer.

12. A data storage system comprising:
non-volatile storage;
memory; and
controlling circuitry coupled to the memory, the controlling circuitry constructed and arranged to:
generate an node structure describing a file of the file system, the node structure having block pointers pointing to respective data blocks of the file system storing data of the file, each data block having a size;

for each of a first set of data blocks of the file system, configuring deduplication for the respective data block by selectively inserting, in response to an access frequency to the data block being below a threshold, of a virtual block virtualization structure (BVS) between that data block and the block pointer in the inode structure that points to that data block, the BVS providing deduplication metadata of the data block within the file system; and for each of a second set of data blocks of the file system, disable deduplication of the respective data block by providing, in response to the access frequency to the data block exceeding the threshold, access to the block without inserting a BVS that provides metadata for supporting deduplication of data of the data block within the file system, wherein the controlling circuitry is further constructed and arranged to, prior to the act of inserting, perform a decision operation to determine whether to insert a BVS between a data block and a block pointer that points to the data block based on a specified criterion, data blocks of the first set of data blocks satisfying the specified criterion, data blocks of the second set of data blocks not satisfying the specified criterion, wherein the specified criterion is satisfied when an access frequency of a data block is less than the threshold, wherein the controlling circuitry constructed and arranged to perform the decision operation is further constructed and arranged to compare the access frequency of the data block to the threshold, wherein, for each of the first set of data blocks, the controlling circuitry constructed and arranged to insert the BVS between the data block and the block pointer is further constructed and arranged to provide multiple BVS entries, each BVS entry having a block segment pointer that points to a respective segment of the data block, each segment having a size that is a fraction of the size of the data block, wherein the controlling circuitry constructed and arranged to generate the inode structure is further constructed and arranged to allocate a bit in a granularity bitmap, the granularity bitmap having bits corresponding to respective data blocks of the file system, each bit of the granularity bitmap indicating whether a BVS has been inserted between the data block to which the bit corresponds and the block pointer pointing to that data block; and wherein, for each of the first set of data blocks, the controlling circuitry constructed and arranged to insert the BVS between the data block and the block pointer is further constructed and arranged to update the bit of the granularity bitmap corresponding to the data block to indicate that a BVS has been inserted between the data block and the block pointer.

13. A data storage system as in claim 12, wherein a first BVS entry of the BVS has a first block segment pointer that points to a first segment of the data block; and wherein the controlling circuitry is further constructed and arranged to perform a deduplication operation on data contained in the first segment, the deduplication operation including updating the first block segment pointer to point to a location in the file system at which data that is identical to data stored in the first segment is stored.

14. A data storage system as in claim 13, wherein the controlling circuitry constructed and arranged to provide the multiple BVS entries is further constructed and arranged to provide an allocation bitmap, the allocation bitmap having bits corresponding to respective segments of the data block, each bit of the allocation bitmap indicating whether a respective segment is allocated or free; and wherein the controlling circuitry constructed and arranged to perform the deduplication operation on the data contained in the first segment is further constructed and arranged to update the bit of the allocation bitmap corresponding to the first segment to indicate that the first segment is free.

15. A computer program product comprising a non-transitory, computer-readable storage medium which stores executable code, which when executed by a storage processor of a data storage system, causes the storage processor to perform a method of managing a file system in a data storage system, the method comprising:

generating, by a processor of the data storage system, an node structure describing a file of the file system, the node structure having block pointers pointing to respective data blocks of the file system storing data of the file;

for each of a first set of data blocks of the filesystem, deduplication for the respective data block by selectively inserting, in response to an access frequency to the data block being below a threshold, a BVS structure between that data block and the block pointer in the inode structure that points to that data block, the BVS structure providing deduplication metadata of the data block within the file system; and for each of a second set of data blocks of the file system, disabling deduplication of the respective data block by providing, in response to the access frequency to the data block exceeding the threshold, access to the block without inserting a BVS structure that provides metadata for supporting deduplication of data of the data block within the file system, wherein the method further comprises, prior to the act of inserting, performing a decision operation to determine whether to insert a BVS between a data block and a block pointer that points to the data block based on a specified criterion, data blocks of the first set of data blocks satisfying the specified criterion, data blocks of the second set of data blocks not satisfying the specified criterion, wherein performing the decision operation includes comparing an access frequency of a data block to the threshold, and wherein the specified criterion is satisfied when the access frequency of the data block is less than the threshold, wherein each data block has a size; and wherein, for each of the first set of data blocks, inserting the BVS between the data block and the block pointer includes providing multiple BVS entries, each BVS entry having a block segment pointer that points to a respective segment of the data block, each segment having a size that is a traction of the size of the data block, wherein generating the inode structure includes allocating a bit in a granularity bitmap, the granularity bitmap having bits corresponding to respective data blocks of the file system, each bit of the granularity bitmap indicating whether a BVS has been inserted between the data block to which the bit corresponds and the block pointer pointing to that data block; and wherein, for each of the first set of data blocks, inserting the BVS between the data block and the block pointer includes updating the bit of the granularity bitmap corresponding to the data block to indicate that a BVS has been inserted between the data block and the block pointer.

* * * * *